(12) United States Patent
Liu

(10) Patent No.: US 11,964,721 B1
(45) Date of Patent: Apr. 23, 2024

(54) BICYCLE VERTICAL RACK CAPABLE OF BEING ADJUSTED TO A DESIRED FIXED ANGLE

(71) Applicant: YEONG TON INDUSTRIAL CO., LTD., Tainan (TW)

(72) Inventor: Yao-Huang Liu, Tainan (TW)

(73) Assignee: YEONG TON INDUSTRIAL CO., LTD., Tainan (TW)

( * ) Notice: Subject to any disclaimer, the term of this patent is extended or adjusted under 35 U.S.C. 154(b) by 0 days.

(21) Appl. No.: 18/188,626

(22) Filed: Mar. 23, 2023

(51) Int. Cl.
    *B62H 3/10*    (2006.01)

(52) U.S. Cl.
    CPC ...................... *B62H 3/10* (2013.01)

(58) Field of Classification Search
    CPC ... B62H 3/00; B62H 3/02; B62H 3/04; B62H 3/06; B62H 3/10; B62H 3/12; B62H 2700/00
    See application file for complete search history.

(56) References Cited

U.S. PATENT DOCUMENTS

| | | | | |
|---|---|---|---|---|
| 1,975,303 A * | 10/1934 | Walker | ..................... | G10G 5/00 248/315 |
| 5,078,276 A * | 1/1992 | Rogge | ..................... | B62H 3/12 248/289.11 |
| 5,083,729 A * | 1/1992 | Saeks | ................. | A47B 96/1425 248/200.1 |
| 5,294,006 A * | 3/1994 | Deschino | .............. | A47F 5/0853 211/5 |
| 5,447,241 A * | 9/1995 | Bureau | ..................... | B62H 3/02 211/5 |
| 5,642,820 A * | 7/1997 | Angeles | ..................... | B62H 3/06 211/103 |
| 6,371,309 B1 * | 4/2002 | Smith | ..................... | B62H 3/12 248/230.1 |
| 6,494,327 B2 * | 12/2002 | Huang | ................... | F16M 11/28 211/205 |
| 6,679,388 B1 * | 1/2004 | Chiu | ..................... | B62H 3/12 248/170 |
| 6,729,478 B1 * | 5/2004 | Boers | ..................... | B62H 3/12 211/18 |
| 6,843,380 B1 * | 1/2005 | Fickett | ..................... | B62H 3/06 211/17 |
| 6,983,853 B1 * | 1/2006 | Fickett | ..................... | A47F 7/00 248/303 |
| 7,055,725 B1 * | 6/2006 | Kolda | ..................... | B60R 9/10 224/924 |

(Continued)

*Primary Examiner* — Patrick D Hawn
(74) *Attorney, Agent, or Firm* — Demian K. Jackson; Jackson IPG PLLC

(57) ABSTRACT

A bicycle vertical rack contains a base, a support post, and at least one hanging unit. A respective one hanging unit includes a coupling element, a fixing tube, a rotary tube, a resilient element, a defining element, a horizontal plate, and two hooks. The fixing tube includes a through hole. The rotary tube has a movable groove, a recess and multiple cutouts which. An end of a respective one cutout communicates with the recess, a rear end of the rotary tube is received in the fixing tube, and the resilient element abuts against the fixing tube and the rotary tube. The defining element is received in the through hole and the movable groove, an inner wall of the horizontal plate is connected with a front end of the rotary tube, and the two hooks are connected to an outer wall of the horizontal plate.

6 Claims, 6 Drawing Sheets

(56) References Cited

U.S. PATENT DOCUMENTS

| | | | | |
|---|---|---|---|---|
| 7,669,822 | B2* | 3/2010 | Kluge | F16B 45/02 |
| | | | | 248/306 |
| 8,047,492 | B2* | 11/2011 | Wang | B62H 3/12 |
| | | | | 211/106.01 |
| 8,528,748 | B2* | 9/2013 | Shaha | B62H 3/12 |
| | | | | 211/17 |
| 8,820,543 | B2* | 9/2014 | Huang | F16B 2/246 |
| | | | | 248/230.4 |
| 9,145,181 | B2* | 9/2015 | Peruzzo | B62H 3/02 |
| 10,750,859 | B1* | 8/2020 | Fickett | A47F 5/083 |
| 10,822,045 | B1* | 11/2020 | Shen | B62H 3/12 |
| 11,046,380 | B1* | 6/2021 | Gu | B62H 3/12 |
| 11,161,561 | B1* | 11/2021 | Gu | B62H 3/12 |
| 11,254,383 | B1* | 2/2022 | Huang | B62H 3/12 |
| 11,457,735 | B1* | 10/2022 | D'Isep | A47B 57/045 |
| 2004/0217239 | A1* | 11/2004 | Chuang | F16M 11/28 |
| | | | | 248/125.8 |
| 2005/0056740 | A1* | 3/2005 | Chuang | B62H 3/12 |
| | | | | 248/176.1 |
| 2008/0087058 | A1* | 4/2008 | Chang | E05B 71/00 |
| | | | | 411/432 |
| 2019/0002046 | A1* | 1/2019 | Tsai | A47F 5/04 |
| 2020/0353611 | A1* | 11/2020 | Smith | B62H 3/12 |

\* cited by examiner

US 11,964,721 B1

BICYCLE VERTICAL RACK CAPABLE OF BEING ADJUSTED TO A DESIRED FIXED ANGLE

TECHNICAL FIELD

The present invention relates to an accessory to a bicycle, and more particularly to a bicycle vertical rack which is capable of being adjusted to a desired fixed angle.

BACKGROUND

As a very convenient commuting and sports equipment, bicycles are owned by many people. However, most people directly fix their bicycles on the ground, which not only takes up too much space but also puts the space above the bicycles, making it difficult to reuse. Also, there is a concern about wasting space. Moreover, not everyone has a floor space for bicycles to be placed in their homes.

Therefore, there are some bicycle vertical racks on the market, but the main components of these vertical bicycle racks are all fixed designs, and they are only used for fixing bicycles on them. It is difficult for users to know whether the bicycles are placed firmly. And the design of the bicycle vertical racks at present adopts for horizontal design corresponding to the top tube of the bicycle, when the top tube of the bicycle is a non-horizontal design style, if placed on the conventional self-standing vertical rack, there will be problems such as offset gravity center or tilted placement.

The present invention has arisen to mitigate and/or obviate the afore-described disadvantages.

SUMMARY

The primary aspect of the present invention is to provide a bicycle vertical rack which is capable of overcoming the shortcomings of the conventional bicycle vertical rack, for example, the bicycle vertical rack cannot be adjusted its fixing angle to a bicycle, a limiting usage to various bicycles, an unstable gravity center and oblique to bicycle.

Another aspect of the present invention is to provide a bicycle vertical rack which is capable of fixing various bicycle stably and enhancing using the application and fixing stability.

To obtain the above-mentioned aspects, a bicycle vertical rack provided by the present invention contains a base, a support post, and at least one hanging unit. The support post is vertically connected with the base. A respective one hanging unit includes a coupling element, a fixing tube, a rotary tube, a resilient element, a defining element, a horizontal plate, and two hooks. The fixing tube includes a through hole defined thereon, and a rear end of the fixing tube is connected with the support post. The rotary tube has a movable groove defined thereon, a recess and multiple cutouts which are defined in the movable groove. The multiple cutouts are defined parallelly and extend axially, and any two adjacent cutouts are spaced from a predetermined distance. An end of a respective one cutout communicates with the recess, a rear end of the rotary tube is received in the fixing tube, and the resilient element abuts against the fixing tube and the rotary tube. The defining element is received in the through hole and the movable groove, an inner wall of the horizontal plate is connected with a front end of the rotary tube, and the two hooks are connected to an outer wall of the horizontal plate.

DETAILED DESCRIPTION

Figure 1:
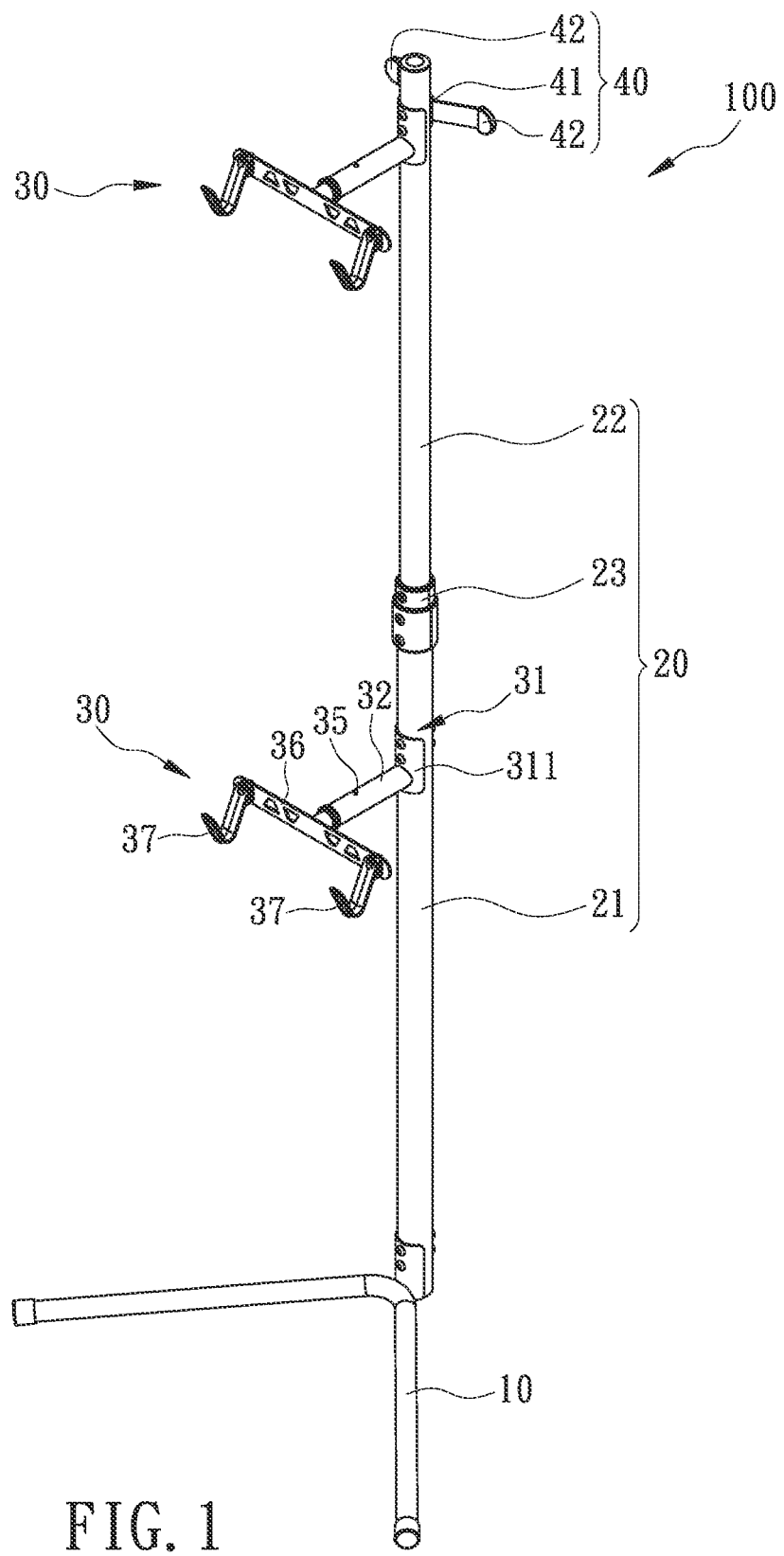
FIG. 1 is a perspective view showing the assembly of a bicycle vertical rack according to a preferred embodiment of the present invention.
Figure 2:
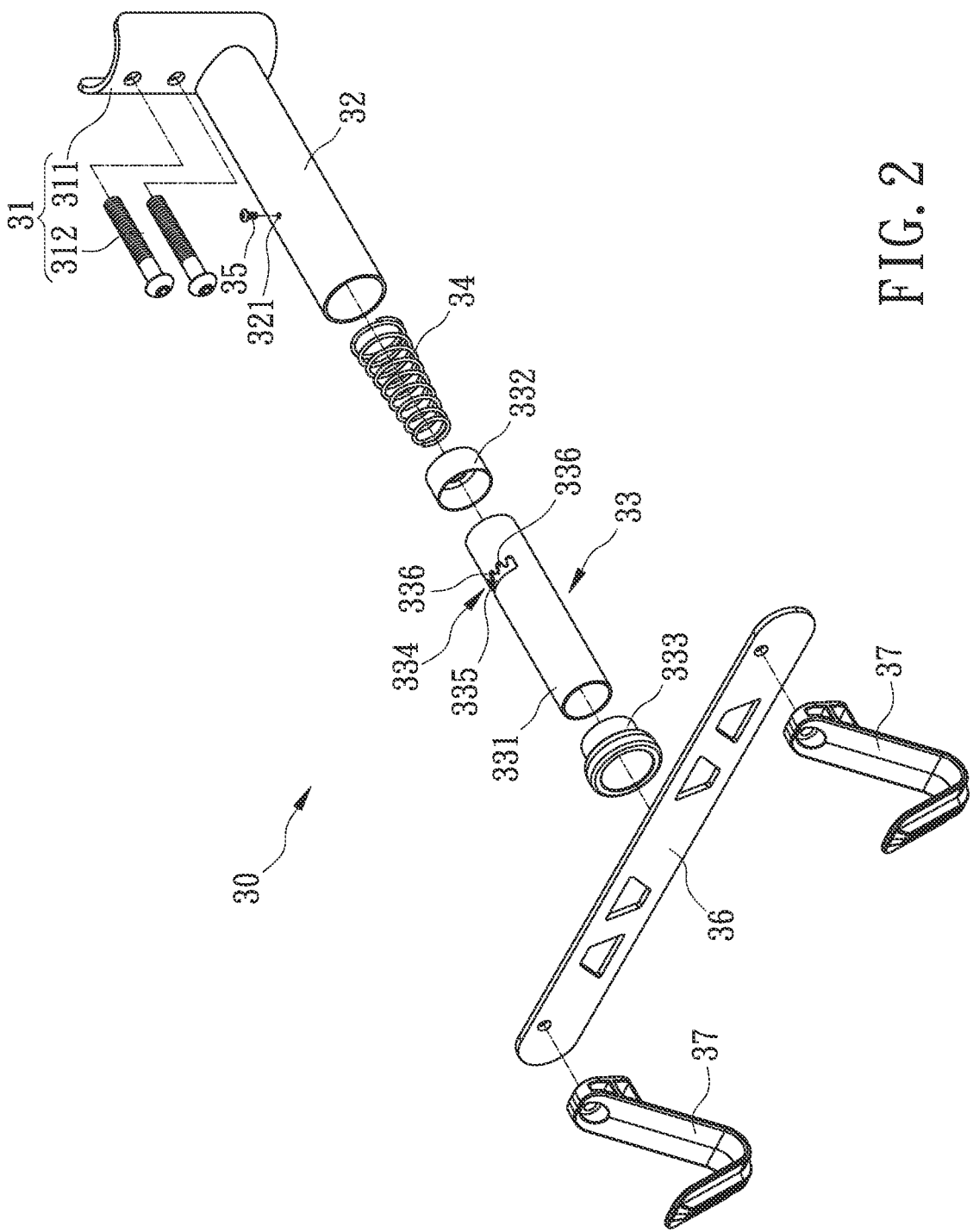
FIG. 2 is a perspective view showing the exploded components of a part of the bicycle vertical rack according to the preferred embodiment of the present invention.

With reference to FIGS. 1-8, a bicycle vertical rack 100 according to a preferred embodiment of the present invention is capable of being adjusted to a desired fixed angle, the bicycle vertical rack 100 comprises a base 10, a support post 20, two hanging holders 30, and a fixer 40.

Referring to FIG. 1, the base 10 is mounted on the ground.

As shown in FIG. 1, the support post 20 includes a first connection column 21, a second connection column 22, and a height adjustment unit 23. A bottom of the first connection column 21 is vertically connected with the base 10, and a bottom of the second connection column 22 is fitted with a top of the first connection column 21, such that the support post 20 is erected vertically. The height adjustment unit 23 is fixed between the first connection column 21 and the second connection column 22 so as to adjust a position of the first connection column 21 with respect to a position of the second connection column 22. For example, when the height adjustment unit 23 is released, the second connection column 22 is slidable upward and downward with respect to the first connection column 21 so as to be adjustably moved to a desired height. When the height adjustment unit 23 is forced, the second connection column 22 and the first connection column 21 are not slidable to fix a total height of the first connection column 21 and the second connection column 22.

Referring to FIGS. 1-8, the two hanging units 30 are connected with the first connection column 21 and the second connection column 22 of the support post 20, wherein a respective one hanging unit 30 includes a coupling element 31, a fixing tube 32, a rotary tube 33, a resilient element 34, a defining element 35, a horizontal plate 36, and two hooks 37. The coupling element 31 is connected to an outer wall of the support post 20, and the coupling element 31 has an arcuate sheet 311 and multiple screw bolts 312, wherein the arcuate sheet 311 contacts with the outer wall of the support post 20, the multiple screw bolts 312 are inserted through the arcuate sheet 311 and the support post 20 to lock the arcuate sheet 311 on the outer wall of the support post 20. The fixing tube 32 is hollow and includes a through hole 321 defined thereon, wherein the through hole 321 is threaded, and a rear end of the fixing tube 3 is connected with the arcuate sheet 311 of the coupling element 31 so that the fixing tube 32 is connected with the support post 20 at 90 degrees, i.e., the support post 20 is vertical with respect to the fixing tube 32, and the fixing tube 32 is horizontal with respect to the support post 20. The rotary tube 33 has a rotatable extension 331, a first fitting sleeve 332 fitted on a rear end of the rotatable extension 331, and a second sleeve 333 fitted on a front end of the rotatable extension 331, wherein the rear end of the rotatable extension 331 and the first fitting sleeve 332 are received in the fixing tube 32, the rotatable extension 331 has a movable groove 334 defined thereon, a recess 335 and multiple cutouts 336 which are defined on the movable groove 334, wherein the multiple cutouts 336 are defined parallelly and extend axially, and any two adjacent cutouts 336 are spaced from a predetermined distance, an end of a respective one cutout 336 communicates with the recess 335. The resilient element 34 is a compression spring and is accommodated in the fixing tube 32, wherein a first end of the resilient element 34 abuts against a rear end of the fixing tube, and a second end of the resilient element 34 contacts with the first fitting sleeve 332 of a rear end of the rotary tube 33. The defining element 35 is received in the through hole 321 of the fixing tube 32 and the movable groove 334 of the rotary tube 33. In this embodiment, the defining element 35 is a screw and is received in the movable groove 334 after being screwed with the through orifice 321. An inner wall of a middle section of the horizontal plate 36 is horizontally connected with a front end of the rotary tube 33. The two hooks 37 are connected to an outer wall of the horizontal plate 36 in a predetermined distance.

As illustrated in FIG. 1, the fixer 40 is horizontally connected to the support post 20 to abut against a wall stably. The fixer 40 includes a locking portion 41 formed on a middle section thereof and configured to connect to the outer wall of the second connection column 22 of the support post 20, wherein the fixer 40 is located opposite to the two hanging units 30, and the fixer 40 includes two contact portions 42 formed on two ends thereof to contact with the wall.

Figure 3:
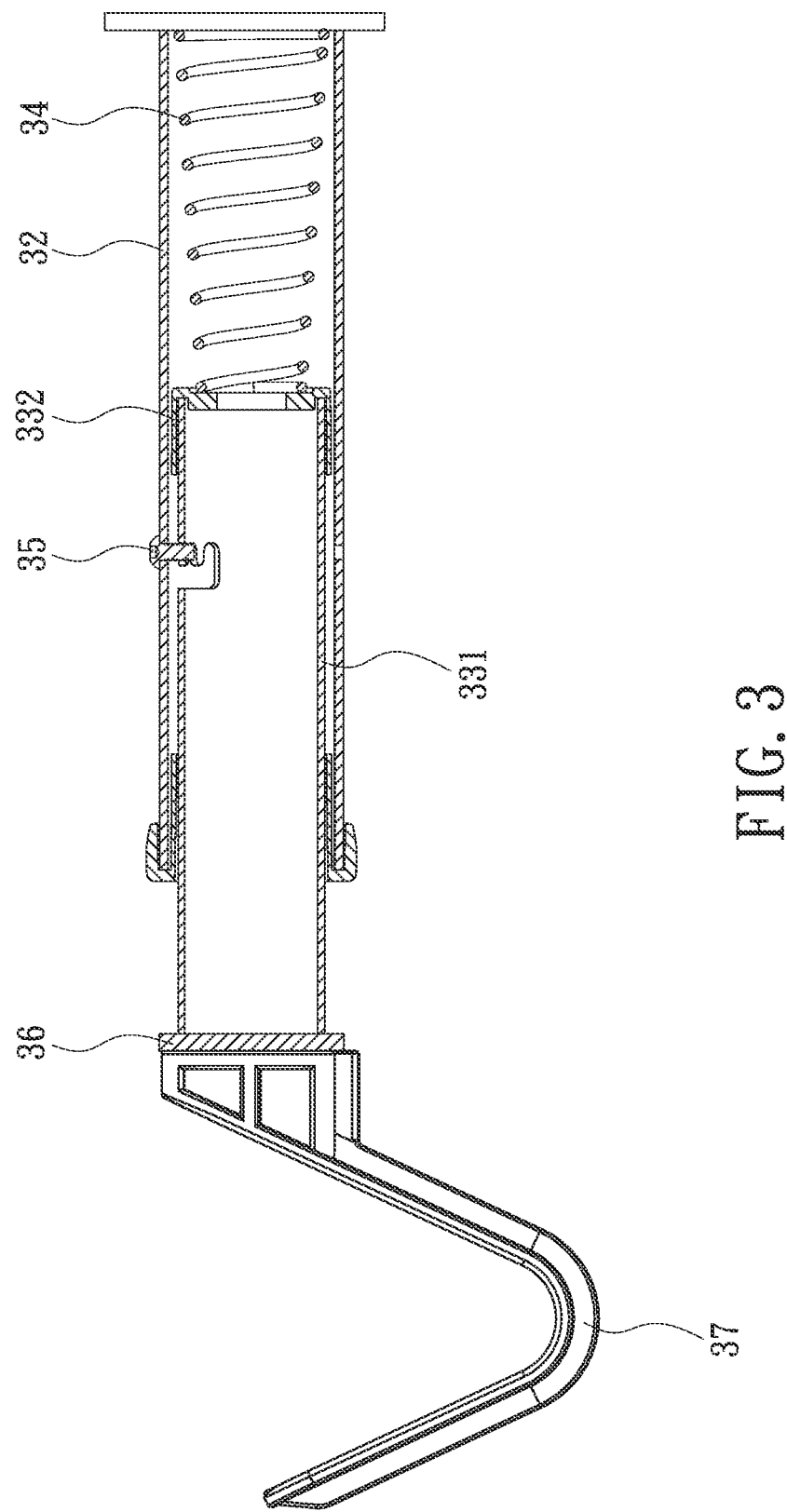
FIG. 3 is a cross sectional view showing the operation of the bicycle vertical rack according to the preferred embodiment of the present invention.
Figure 5:
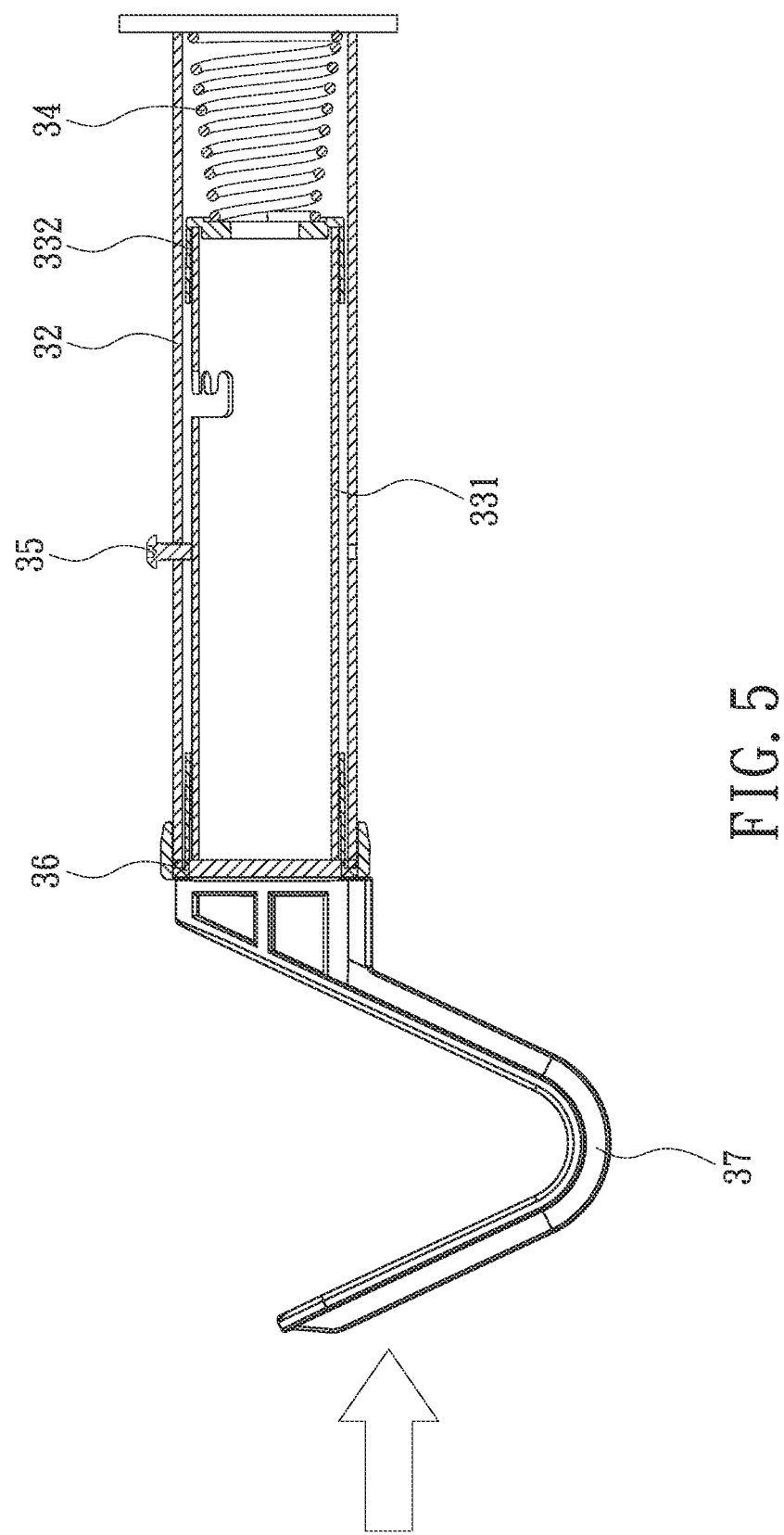
FIG. 5 is also another cross sectional view showing the operation of the bicycle vertical rack according to the preferred embodiment of the present invention.
Figure 4:
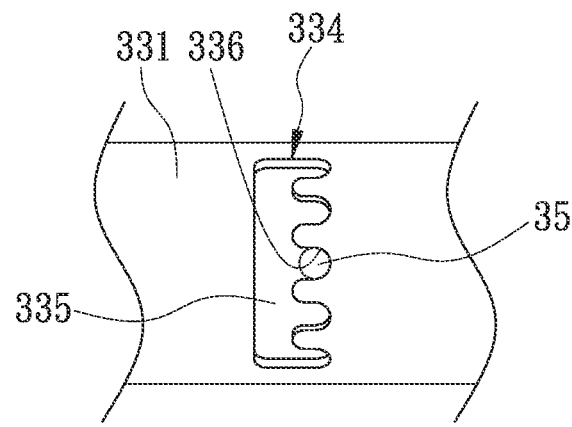
FIG. 4 is another cross sectional view showing the operation of the bicycle vertical rack according to the preferred embodiment of the present invention.
Figure 6:
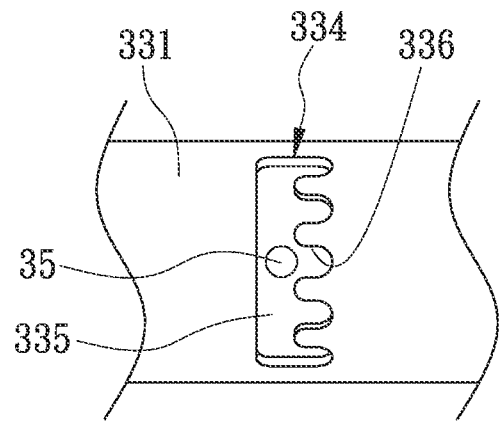
FIG. 6 is still another cross sectional view showing the operation of the bicycle vertical rack according to the preferred embodiment of the present invention.
Figure 7:
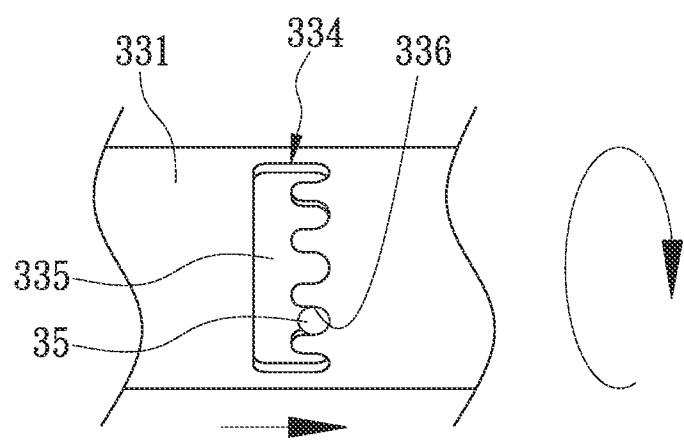
FIG. 7 is another cross sectional view showing the operation of the bicycle vertical rack according to the preferred embodiment of the present invention.
Figure 8:
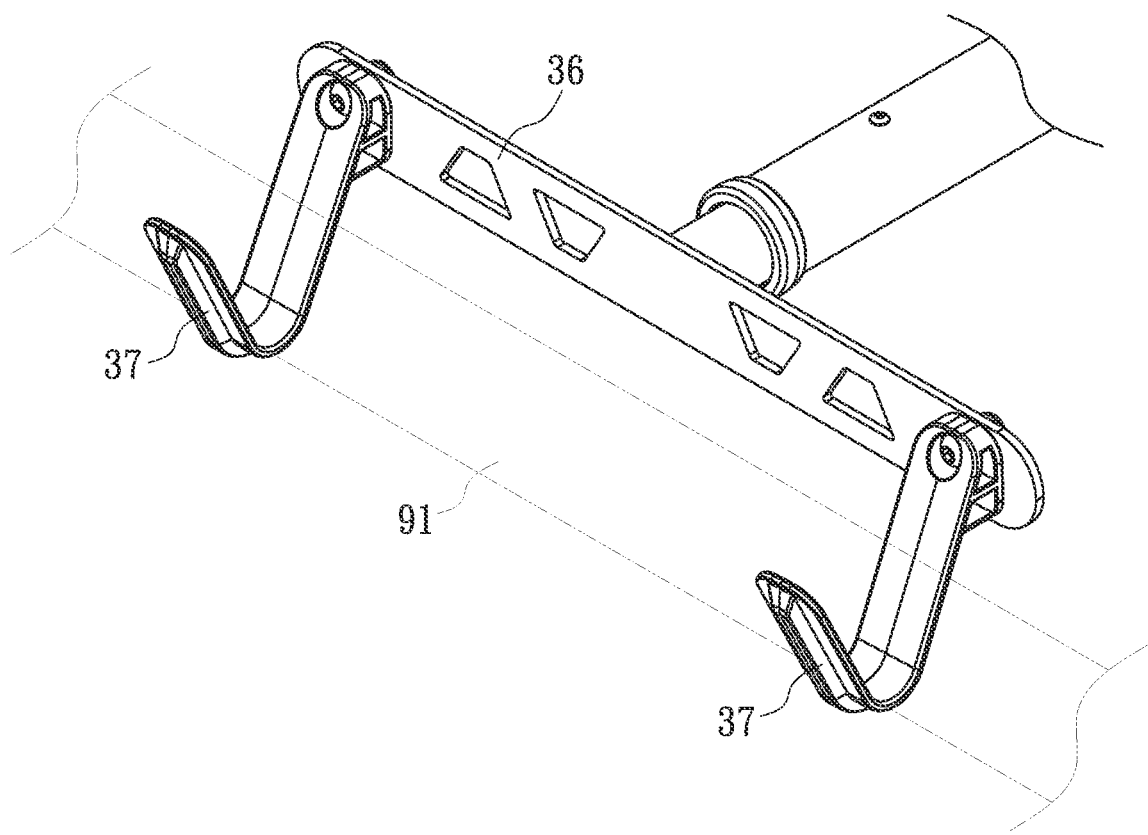
FIG. 8 is a perspective view showing the operation of the bicycle vertical rack according to the preferred embodiment of the present invention.

In operation, a top tube 91 of the bicycle is mounted on the two hooks 37 of one hanging unit 30. When the top tube 91 is not horizontal, the horizontal plate 36 tilts with a unstable gravity center, and the horizontal plate 36 is forced by a user so that the rotary tube 33 pushed by the resilient element 34 is moved inward (as shown in FIG. 3), hence the defining element 35 is urged by the rotary tube 33 to slide into the movable groove 334 (as illustrated in FIG. 6) from one of the multiple cutouts 336 (as shown in FIG. 4). In the meantime, the horizontal plate 36 is rotated by the user to actuate the rotary tube 33 to revolve until the gravity center of the bicycle is stable. Thereafter, the horizontal plate 36 is released so that the rotary tube 33 is pushed by the resilient element 34 to move outward, and the defining element 35 slides into a corresponding cutout 336 (as shown in FIG. 7), thus stabilizing the gravity center of the bicycle on the top tube 91 (as shown in FIG. 8).

In the above-mentioned embodiments, the horizontal plate 36 is driven by the user to rotate the rotary tube 33 or to move the rotary tube 33 inward. In actual use, the user forces the bicycle to rotate the rotary tube 33 or move the rotary tube 33 inward.

The resilient element is configured to push the rotary tube outward or inward and to move in the multiple cutouts so that the horizontal plate is adjustably moved and positioned horizontally or at any tilted angles based on using requirements, thus fixing the bicycle on the bicycle vertical racks stably.

In another embodiment, at least three hanging units (such as four hanging units) are provided to fix the bicycle.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A bicycle vertical rack comprising:
    a base;
    a support post vertically connected with the base; and
    at least one hanging unit, wherein a respective one hanging unit includes a coupling element, a fixing tube, a rotary tube, a resilient element, a defining element, a first plate, and two hooks; the fixing tube includes a through hole defined thereon, wherein a rear end of the fixing tube is connected with the support post, the rotary tube has a movable groove defined thereon, a recess and multiple cutouts which are defined in the movable groove, wherein the multiple cutouts are defined parallelly and extend axially, and any two adjacent cutouts are spaced from a predetermined distance, an end of a respective one cutout communicates with the recess, wherein a rear end of the rotary tube is received in the fixing tube, the resilient element abuts against the fixing tube and the rotary tube, the defining element is received in the through hole and the movable groove, and an inner wall of the first plate is connected with a front end of the rotary tube, wherein the two hooks are connected to an outer wall of the first plate,
    wherein a respective one hanging unit includes a coupling element by which the fixing tube is connected to the support post, and,
    wherein the coupling element has an arcuate sheet and multiple screw bolts, the arcuate sheet contacts with an outer wall of the support post, and the multiple screw bolts are inserted through the arcuate sheet and the support post to lock the arcuate sheet on the outer wall of the support post.

2. The bicycle vertical rack as claimed in claim 1, wherein the support post includes a first connection column, a second connection column, and a height adjustment unit; wherein a bottom of the first connection column is vertically connected with the base, and a bottom of the second connection column is fitted with a top of the first connection column, wherein the height adjustment unit is fixed between the first connection column and the second connection column so as to adjust a position of the first connection column with respect to a position of the second connection column; wherein when the height adjustment unit is released, the second connection column is slidable upward and downward with respect to the first connection column so as to be adjustably moved to a desired height; wherein when the at least one hanging unit is forced, the second connection column and the first connection column are not slidable to fix a total height of the first connection column and the second connection column.

3. The bicycle vertical rack as claimed in claim 1,
    wherein the through hole is threaded, and the defining element is a screw.

4. The bicycle vertical rack as claimed in claim 1, wherein the resilient element is a compression spring.

5. A bicycle vertical rack comprising:
a base;
a support post vertically connected with the base; and
at least one hanging unit, wherein a respective one hanging unit includes a coupling element, a fixing tube, a rotary tube, a resilient element, a defining element, a first plate, and two hooks; the fixing tube includes a through hole defined thereon, wherein a rear end of the fixing tube is connected with the support post, the rotary tube has a movable groove defined thereon, a recess and multiple cutouts which are defined in the movable groove, wherein the multiple cutouts are defined parallelly and extend axially, and any two adjacent cutouts are spaced from a predetermined distance, an end of a respective one cutout communicates with the recess, wherein a rear end of the rotary tube is received in the fixing tube, the resilient element abuts against the fixing tube and the rotary tube, the defining element is received in the through hole and the movable groove, and an inner wall of the first plate is connected with a front end of the rotary tube, wherein the two hooks are connected to an outer wall of the first plate,
wherein the rotary tube has a rotatable extension, a first fitting sleeve fitted on a rear end of the rotatable extension, and a second sleeve fitted on a front end of the rotatable extension, wherein the rear end of the rotatable extension and the first fitting sleeve are received in the fixing tube, and the movable groove is defined on the rotatable extension.

6. The bicycle vertical rack as claimed in claim 1, A bicycle vertical rack comprising:
a base;
a support post vertically connected with the base;
a fixer horizontally connected to the support post to abut against a wall stably; and
at least one hanging unit, wherein a respective one hanging unit includes a coupling element, a fixing tube, a rotary tube, a resilient element, a defining element, a first plate, and two hooks; the fixing tube includes a through hole defined thereon, wherein a rear end of the fixing tube is connected with the support post, the rotary tube has a movable groove defined thereon, a recess and multiple cutouts which are defined in the movable groove, wherein the multiple cutouts are defined parallelly and extend axially, and any two adjacent cutouts are spaced from a predetermined distance, an end of a respective one cutout communicates with the recess, wherein a rear end of the rotary tube is received in the fixing tube, the resilient element abuts against the fixing tube and the rotary tube, the defining element is received in the through hole and the movable groove, and an inner wall of the first plate is connected with a front end of the rotary tube, wherein the two hooks are connected to an outer wall of the first plate,
wherein the fixer includes a locking portion formed on a middle section thereof and configured to connect to the outer wall of the second connection column of the support post, wherein the fixer includes two contact portions formed on two ends thereof to contact with the wall.

* * * * *